US010666637B2

(12) United States Patent
Cignetti et al.

(10) Patent No.: US 10,666,637 B2
(45) Date of Patent: May 26, 2020

(54) CERTIFICATE RENEWAL AND DEPLOYMENT

(71) Applicant: Amazon Technologies, Inc., Reno, NV (US)

(72) Inventors: Todd Lawrence Cignetti, Ashburn, VA (US); Preston Elder, Fairfax, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/968,280

(22) Filed: Dec. 14, 2015

(65) Prior Publication Data
US 2017/0171191 A1    Jun. 15, 2017

(51) Int. Cl.
| | |
|---|---|
| H04L 29/06 | (2006.01) |
| H04L 9/32 | (2006.01) |
| H04L 9/08 | (2006.01) |
| H04L 12/46 | (2006.01) |
| H04L 12/24 | (2006.01) |

(52) U.S. Cl.
CPC ........ *H04L 63/0823* (2013.01); *H04L 9/0891* (2013.01); *H04L 9/321* (2013.01); *H04L 9/3226* (2013.01); *H04L 9/3268* (2013.01); *H04L 12/4625* (2013.01); *H04L 63/06* (2013.01); *H04L 63/10* (2013.01); *H04L 41/08* (2013.01); *H04L 63/108* (2013.01)

(58) Field of Classification Search
CPC . H04L 9/0825; H04L 9/0823; H04L 12/4625; H04L 41/08; G06F 21/33
See application file for complete search history.

(56) References Cited

U.S. PATENT DOCUMENTS

| | | | | |
|---|---|---|---|---|
| 8,935,524 | B1 * | 1/2015 | Lawrence | H04L 63/0823 713/156 |
| 8,949,597 | B1 * | 2/2015 | Reeves | H04W 12/04 455/422.1 |
| 9,197,630 | B2 * | 11/2015 | Sharif | G06F 21/33 |
| 9,871,662 | B2 * | 1/2018 | Glisson | H04L 9/3268 |
| 2002/0184493 | A1 * | 12/2002 | Rees | H04L 9/3263 713/158 |

(Continued)

OTHER PUBLICATIONS

International Search Report and Written Opinion issued in Application No. PCT/US2016/066286, dated Mar. 2, 2017, 12 pages.

(Continued)

*Primary Examiner* — Madhuri R Herzog
(74) *Attorney, Agent, or Firm* — Hogan Lovells US LLP

(57) ABSTRACT

A certificate manager for a multi-tenant environment can be authorized to automatically renew a certificate for a customer of the environment. Prior to the end of the validity period of the certificate, the certificate manager can obtain a new certificate on behalf of the customer and notify the customer that the certificate is ready to be deployed. The certificate will not be deployed until the customer releases the hold on the certificate. If no such instruction is received, notifications can be sent to the customer about the upcoming end of the validity period, and those notifications can be sent with increasing frequency. If no notification is received before the validity period is to expire, the certificate manager can automatically deploy the certificate to ensure that a valid certificate remains in place for the customer on the associated resource(s).

20 Claims, 6 Drawing Sheets

(56) References Cited

U.S. PATENT DOCUMENTS

| | | | |
|---|---|---|---|
| 2005/0069136 A1 | 3/2005 | Thornton | |
| 2005/0076203 A1* | 4/2005 | Thornton | H04L 63/0823 |
| | | | 713/156 |
| 2005/0273610 A1 | 12/2005 | Kaneda | |
| 2006/0059332 A1* | 3/2006 | Adams | H04L 63/04 |
| | | | 713/156 |
| 2008/0016337 A1* | 1/2008 | Morgan | H04L 63/062 |
| | | | 713/158 |
| 2009/0313468 A1* | 12/2009 | Hazlewood | H04L 63/0823 |
| | | | 713/156 |
| 2012/0108207 A1* | 5/2012 | Schell | H04L 63/0853 |
| | | | 455/411 |
| 2015/0095995 A1 | 4/2015 | Bhalerao | |
| 2017/0005808 A1* | 1/2017 | Gunti | H04L 9/3268 |
| 2017/0006022 A1* | 1/2017 | Gunti | H04L 63/0823 |

OTHER PUBLICATIONS

International Preliminary Report on Patentability issued in Application No. PCT/US2016/066286, dated Jun. 19, 2018.

* cited by examiner

CERTIFICATE RENEWAL AND DEPLOYMENT

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource or "cloud" provider. It will often be the case that a user will want one or more cloud resources to perform actions on behalf of the user. At least some of these actions may require some verification that the resource is authorized to perform such a task or action on behalf of the user and/or that the user is authorized to perform such a task or action. Other actions may require some assurance of security before certain actions can be taken, such as to ensure a communication link is secure. While various security credentials can be issued that enable these actions, these credentials can expire which can cause the associated functionality to be unavailable until the problem is spotted and a new credential put in place.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of resources in an electronic environment. In at least some embodiments, a system, service, or component such as a certificate manager can be configured and authorized to manage certificates on behalf of a customer of a multi-tenant environment. The certificate manager can receive the certificate and cause the certificate to be deployed to the appropriate resource(s). The certificate manager can also maintain a list of associations between certificates and resources, as well as information about the validity periods of those certificates. When a certificate is nearing the end of its validity period, the certificate manager can be authorized to automatically renew the certificate, such as by contacting a certificate authority for a new certificate on behalf of the customer. Instead of deploying the certificate, the certificate manager can be configured to hold the new certificate and notify the customer of the availability of the new certificate to be deployed. If an instruction to deploy is received, the certificate manager can cause the certificate to be deployed. If an instruction is not received, the certificate manger can send additional notifications, with increasing frequency, to the customer. If no instruction is received before the current certificate is to expire, the certificate manager can be authorized to automatically deploy the certificate to the associated resource(s) in order to ensure that a valid certificate is available for the customer.

Various other such functions can be used as well within the scope of the various embodiments as would be apparent to one of ordinary skill in the art in light of the teachings and suggestions contained herein.

Figure 1:
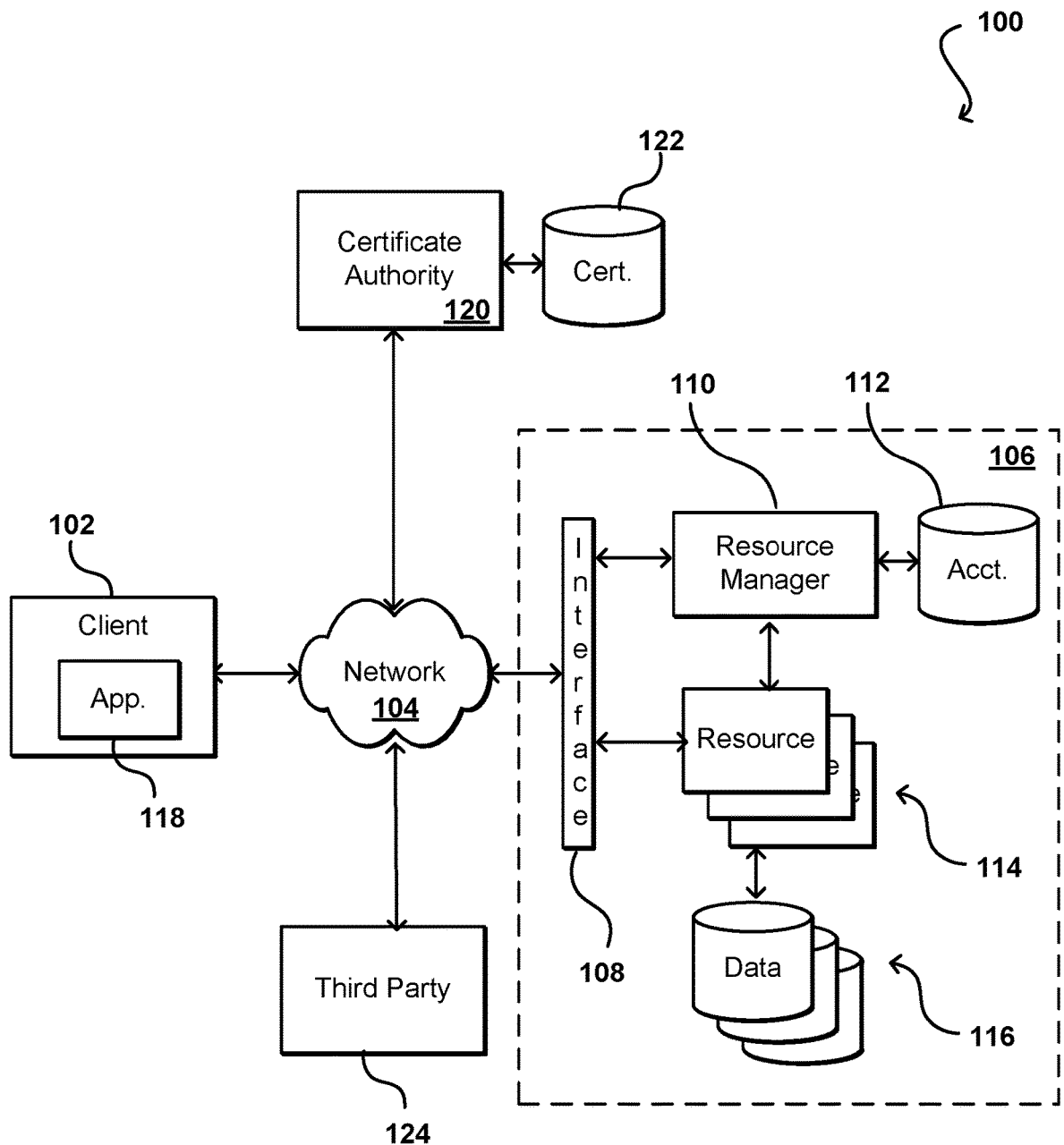
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment (i.e., a "multi-tenant environment") may include various types of electronic resources that can be utilized concurrently by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store.

Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received at an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received at the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In at least some embodiments, a service provider such as a certificate authority (CA) 120 can perform various tasks, such as to provide a certificate or other information useful for verifying the identity of the user and generating information capable of verifying control over certain elements, setting up and/or initializing an email address, validating an alias, and the like. A user might be running an application 118 on a client device that is to perform a task, for example, requiring proof of control. In this example, the application 118 may send a request across the at least one network 104 to the resource provider environment 106 to have a resource 114 of the environment perform a specific task. Since the task requires verification of control, the client device 102 (or resource provider environment 106) can contact a certificate authority 120, or other service provider, to issue a certificate, or other such information, useful for providing such verification. The service provider can be any appropriate entity or authority known or used for such purposes, as may store information, credentials, issued certificates, and other information in a local data store 122 or other such repository. A certificate authority in general is a trusted provider that performs identity validation and other related tasks. As will be discussed later herein, such identifying information can be provided to verify control of the element, which can enable the resource environment 106 to perform various tasks, such as to set up secure communications with a third party system 124 that is associated with a particular domain, among other such options. A certificate from a certificate authority, or other such information from a service provider, can be sufficient to verify identity, but may not be sufficient to verify control in at least some situations.

Figure 2:
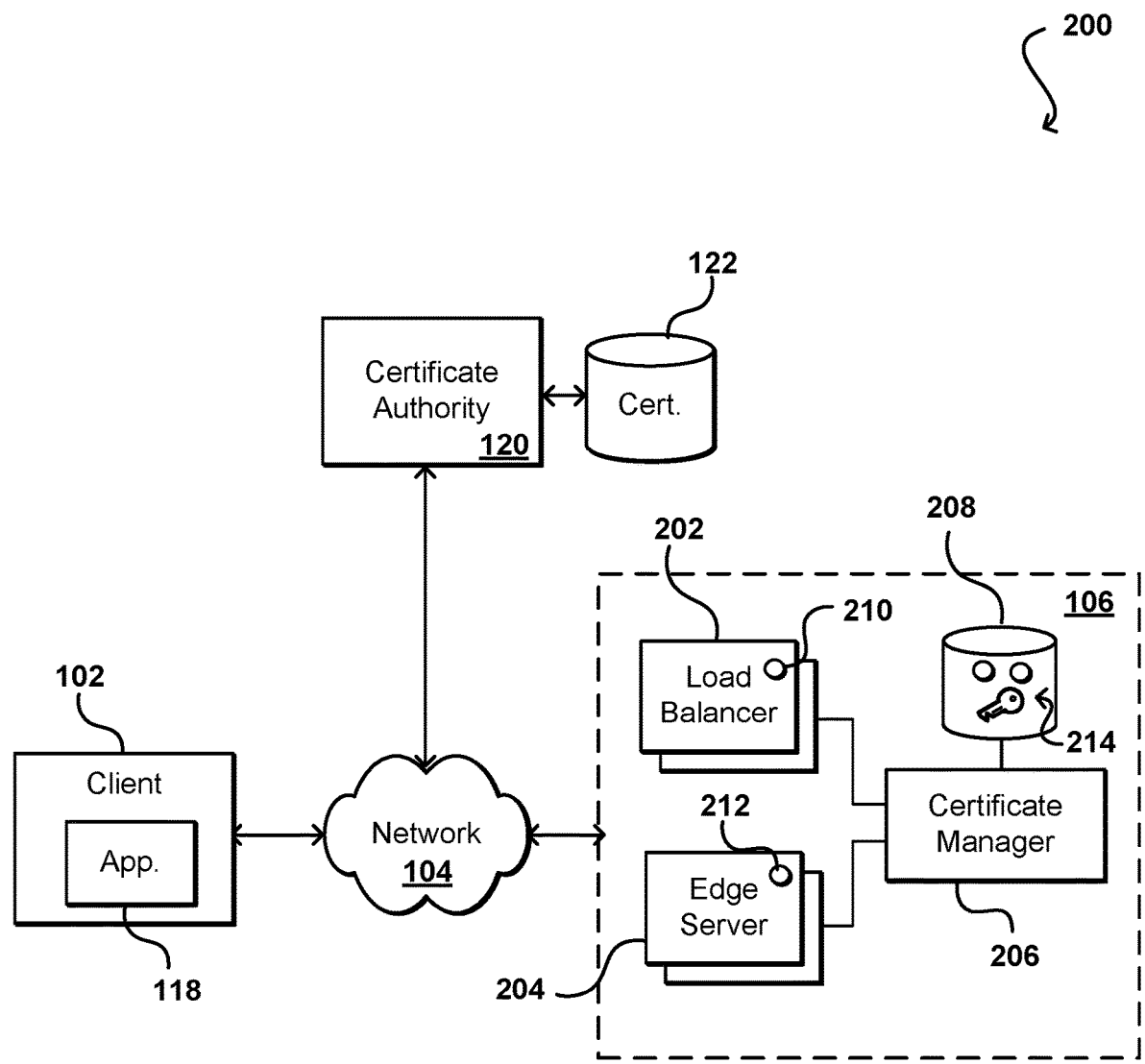
FIG. 2 illustrates an example environment wherein a certificate manager can cause certificates to be automatically renewed, held, and deployed that can be utilized in accordance with various embodiments.

In some instances, a customer of a resource provider environment may require one or more certificates to be deployed to appropriate places throughout the environment. As illustrated in the example situation 200 of FIG. 2, these can include, for example, certificates provided to a load balancer 202 that is configured to direct traffic associated with the customer, or one or more edge servers 204 (or other content delivery networks) configured to serve content (e.g., webpages, images, or video) on behalf of the customer. A certificate manager 206, or other such system or service, can be responsible for managing the certificates in the resource provider environment. This can include, for example, storing the certificates, or information for the certificates, to a certificate data store 208 or other such repository. The certificate data store 208 can include information 214 such as a public and private key pair that is used to request or obtain the certificate, among other such options. The certificate manager can also be tasked with deploying the certificates, such as by sending a certificate 210 for use by a load balancer 202 or a certificate 212 to be used by one or more edge servers. Various other resources and components can utilize certificates for various tasks and purposes and would be understood to one of ordinary skill in the art in light of the teachings and suggestions contained herein.

In at least some embodiments, a certificate manager 206 can support functionality such as automatic certificate renewal for at least some customers of the resource provider environment. This can include, for example, tracking the expiration times (or validity periods) for each of a plurality of certificates, then determining when a certificate is within a threshold period or time from the respective expiration. The threshold can be the same for all certificates, such as a day or an hour before expiration, or can vary by certificate, type of certificate, customer, or other such information. At such a time, the certificate manager 206 can reach out to a certificate authority 120, or other such service provider, to obtain a new certificate on behalf of the respective customer. At an appropriate time, the certificate manager can be configured to deploy the new certificate to the appropriate resources in the resource provider environment, such as to a load balancer or content delivery network, among other such components.

In this example, the certificate manager 206 is configured to hold the certificate for at least a determined period of time after obtaining a new certificate or otherwise renewing the previous certificate on behalf of a customer. Upon obtaining a new certificate, the certificate manager 206 can be configured to notify the customer that the new certificate is ready to be deployed. The notification can be any appropriate notification, such as an email message, SMS message, notification sent to an application 118 executing on a client device 102 associated with the customer, and the like. The type(s) of notification(s) can be determined using any appropriate mechanism, such as specification by the customer or resource provider, automatic detection, customer account information, and the like. In some embodiments different notifications might be sent by different approaches. For example, an initial notification might be sent by email while a notification closer to the time of expiration might be sent by email and SMS, among other such options. In some embodiments, the certificate manager 206 will hold the new certificate in a certificate data store 208 or other such repository until receiving an instruction (i.e., through an API call) on behalf of the customer to deploy the new certificate. This can include, for example, the customer (or an authorized person associated with the customer) approving the deployment through a management console or other such interface. An advantage to enabling the customer to determine when to deploy the certificate is that some customers may prefer to deploy certificates at times when there would be a minimal impact, such as when a website has a low amount of traffic or when there are people standing by to support customers who might have issues with the new certificate. A customer may also prefer to test the new certificate before deployment, among other such options.

It might be the case, however, that a customer will not respond to the notification sent by the certificate manager (or otherwise provided). In such instances, the certificate manager can be configured to periodically notify the customer of the upcoming expiration of the current credential and the readiness of the new credential for deployment. These messages can be sent at regular intervals, at specified times, or with increasing frequency, among other such options. In some embodiments, a notification might be sent once a week when the expiration is at least two weeks away. Once the expiration is within two weeks, a notification frequency might increase to once a day. Once the expiration is within a few days multiple notifications might be sent per day, and so on.

In some instances the inability to deploy a new certificate can cause certain functionality to become unavailable. For example, a secure socket layer (SSL) certificate might be needed to enable secure connections to be established for a customer website. If that certificate expires without a new certificate in place, users of that site will not be able to establish secure connections, which might result in users not being able to place orders through the site or perform other such tasks. In such situations, it may be preferable to go ahead and deploy the new certificate at around the time of expiration of the current certificate in order to attempt to minimize issues with the functionality. In at least some situations a new certificate that users may not be able to fully utilize will be no worse than an expired certificate that no users can utilize, and in many instances will enable users to continue to use some or all of the respective functionality.

A customer can thus have various options for the management of certificates on behalf of that customer. For example, a customer can have the option of managing the certificates themselves, or having a certificate manager automatically deploy a new certificate at a specified time, such as a determined amount of time before a current certificate expires. A customer can also select a renew and hold option, whereby the certificate manager can obtain the new certificate but wait for the customer to instruct the deployment. A customer under a renew and hold option can also select to have the new certificate automatically deployed at, near, or after the expiration of the current certificate if the customer has not otherwise instructed the deployment. Various other management options can be utilized as well within the scope of the various embodiments. Ensuring that a new certificate is deployed before the current certificate expires avoids the certain failure of end users who try to perform certain tasks that require the certificate. This provides a virtual safety net for customers who forget to deploy the new certificate or for one reason or another are unable to instruct the deployment before the certificate expires.

In some embodiments a certificate manager can be responsible initially obtaining the certificate to be used on behalf of the customer. The certificate manager can generate the private and public key pair, and can send a request to the appropriate certificate authority to issue the corresponding certificate. In some embodiments a resource provider environment might include or provide a certificate authority capable of providing the certificate as well, for tasks where such a certificate is applicable. The certificate manager can then control the private key, as well as when the certificate is renewed or a new certificate issued. The certificate manager would also be responsible for tasks such as scheduling deployment and deploying the certificate to the appropriate location(s) at the appropriate time(s). The certificate manager can also maintain a list of associations between resources and certificates, such that the certificate manger can notify a resource (i.e., a system or service operated by the environment) when a corresponding certificate has been renewed and/or is ready to be deployed. In at least some embodiments, the resource can take action, such as to request the new certificate and deploy the certificate on the resource. As mentioned, there can be various rules or policies for deploying a certificate, and in at least some embodiments a resource must comply with an applicable rule or policy when determining to deploy a certificate.

The certificate manager can also maintain information regarding how certificates might be handled differently for different resources and/or how different certificates might be handled for the same resource. For example, a customer certificate might be associated with multiple services. A customer might allow the certificate to automatically be renewed and deployed for certain services, but instruct that the certificate should be renewed and held for other services. The customer can also manually instruct that all renewed certificates be deployed, or can provide instructions for individual certificates. A customer can also provide different deployment schedules and policies for different certificates and/or different resources, among other such options. The customer can also specify control options for different levels for the same certificate, such as a specific resource using the certificate, a service relying on that resource and certificate, and the certificate manager managing the certificate for those components, etc. A customer can also provide instructions for various types of resources or policies that indicate whether notifications are to be sent, how many or how often, etc. A customer can potentially also indicate whether renewed certificates should be held by the resources or the certificate manager before being deployed.

In some embodiments a customer might want to prevent users from thinking a "man in the middle" or similar attack has occurred for a site or service when an application executing on a client device for that user determines that an unexpected change has occurred to the certificate for that site or service. An application such as a Web browser might utilize a technique such as trust on first instance, whereby the browser application takes the first instance of the certificate as the expected certificate and caches information for that certificate. If at a subsequent time the browser application detects an unexpected change to the certificate compared to the cached certificate, the application can at least notify the user of the change before proceeding to perform a task associated with the certificate. In order to prevent such an occurrence for business-critical functions, for example, a customer might decide to "pin" a particular certificate. Pinning a certificate refers to the marking of a certificate such that no change is made to the key for a certificate unless explicitly indicated by the customer. Pinning in some embodiments at least refers to the fact that a certificate should not be automatically rekeyed. A certificate manager might be able to notify the user in the event of a pinned certificate that is about to expire, for example, but is restricted from otherwise taking action with respect to the renewal of the certificate. In cases where there is a certificate chain, such as from the resource up to the certificate authority, any appropriate certificate along the chain can be pinned, which can affect other certificates along the chain as well.

Figure 3:
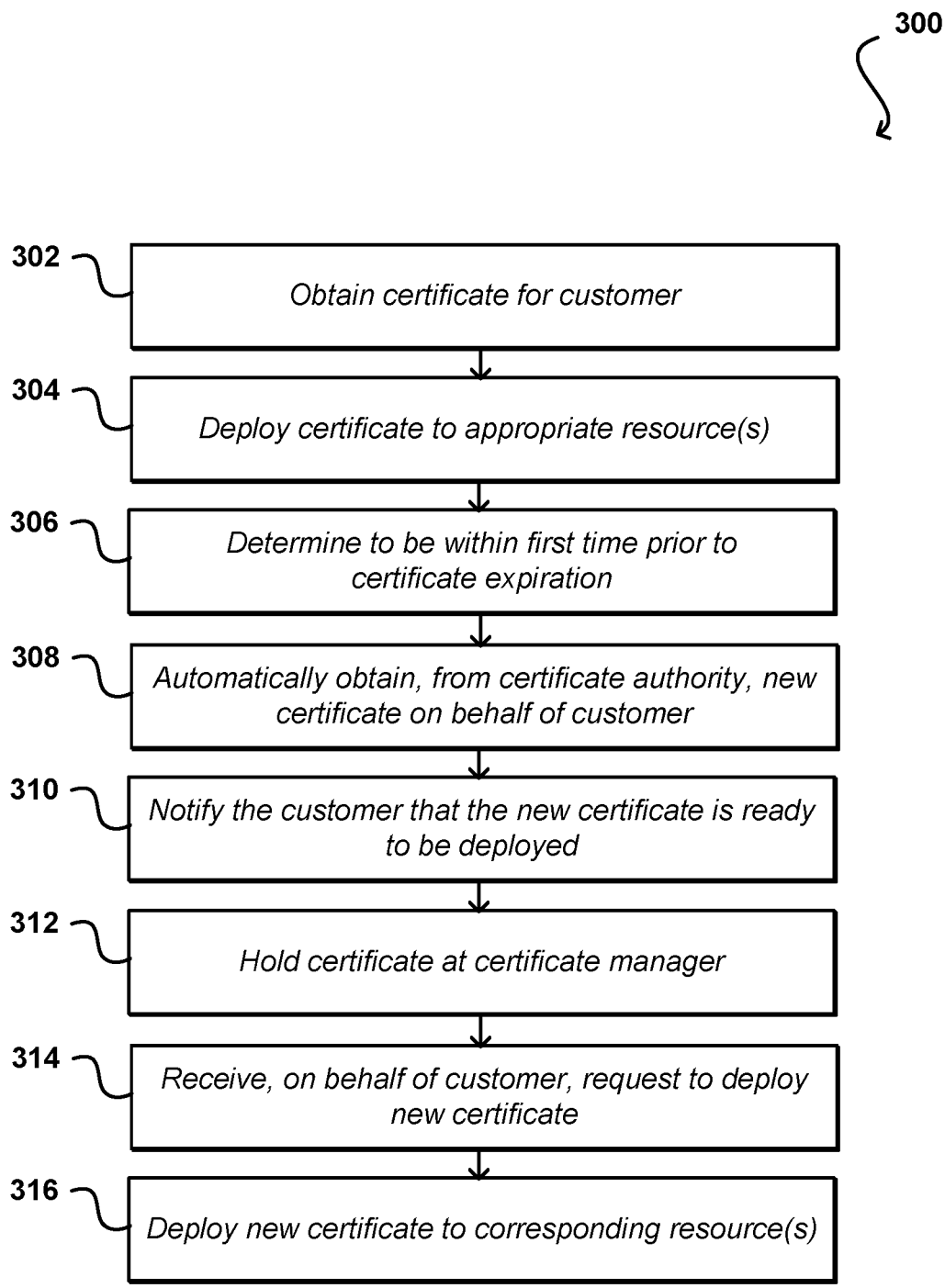
FIG. 3 illustrates an example process for obtaining and deploying a new certificate that can be utilized in accordance with various embodiments.

FIG. 3 illustrates an example process 300 for renewing a certificate on behalf of a customer that can be utilized in accordance with various embodiments. It should be understood that there can be additional, fewer, or alternative steps performed in similar or alternative orders, or in parallel, within the scope of the various embodiments unless otherwise specifically stated. In this example, a certificate is obtained 302 for a customer. This can include a certificate being received to a certificate manager from a customer or certificate authority, or a certificate manager generating a public and private key pair for use by a certificate authority in generating a certificate, among other such options. The certificate can then be deployed 304 to the appropriate resources or locations, such as may include specific resources, systems, services, and the like that are contained within, or operated at least in part by, a resource provider environment. A component such as a certificate manager can store information about the lifetime or expiration of the certificate, and at some point can determine 306 that the certificate will expire within a first determined period of time. This can be any appropriate time as may be set by the customer or provider, for example, such as two months, one month, or two weeks before the certificate is set to expire or become invalid. In this example and for this certificate, the certificate manager can be configured and authorized to automatically obtain 308, from a certificate authority, a new certificate on behalf of the customer. Unless the certificate manager is authorized to automatically deploy the certificate, the certificate manager can notify 310 the associated customer that the new certificate is ready to be deployed. The notification can include other information as well, such as a list of resources associated with the certificate that can have the new certificate deployed by the certificate manager. In this example the new certificate is held 312 by the certificate manager until deployment instructions are received, although in other embodiments the certificate can be held by the resource(s) to which the certificate is potentially to be deployed. A request or instruction can then be received 314 on behalf of the customer to deploy the new certificate. This can be an instruction to deploy the certificate to a single resource, a set of associated resources, or a subset of associated resources, among other such options. The request or instruction can also indicate whether to deploy the certificate immediately, or might specify a specific time for deployment (i.e., an hour before expiration), among other such options. The certificate manager can then deploy 316, or cause to be deployed, the certificate to the corresponding resource(s). Information stored by the certificate manager for the certificate and customer can be updated as appropriate.

Figure 4:
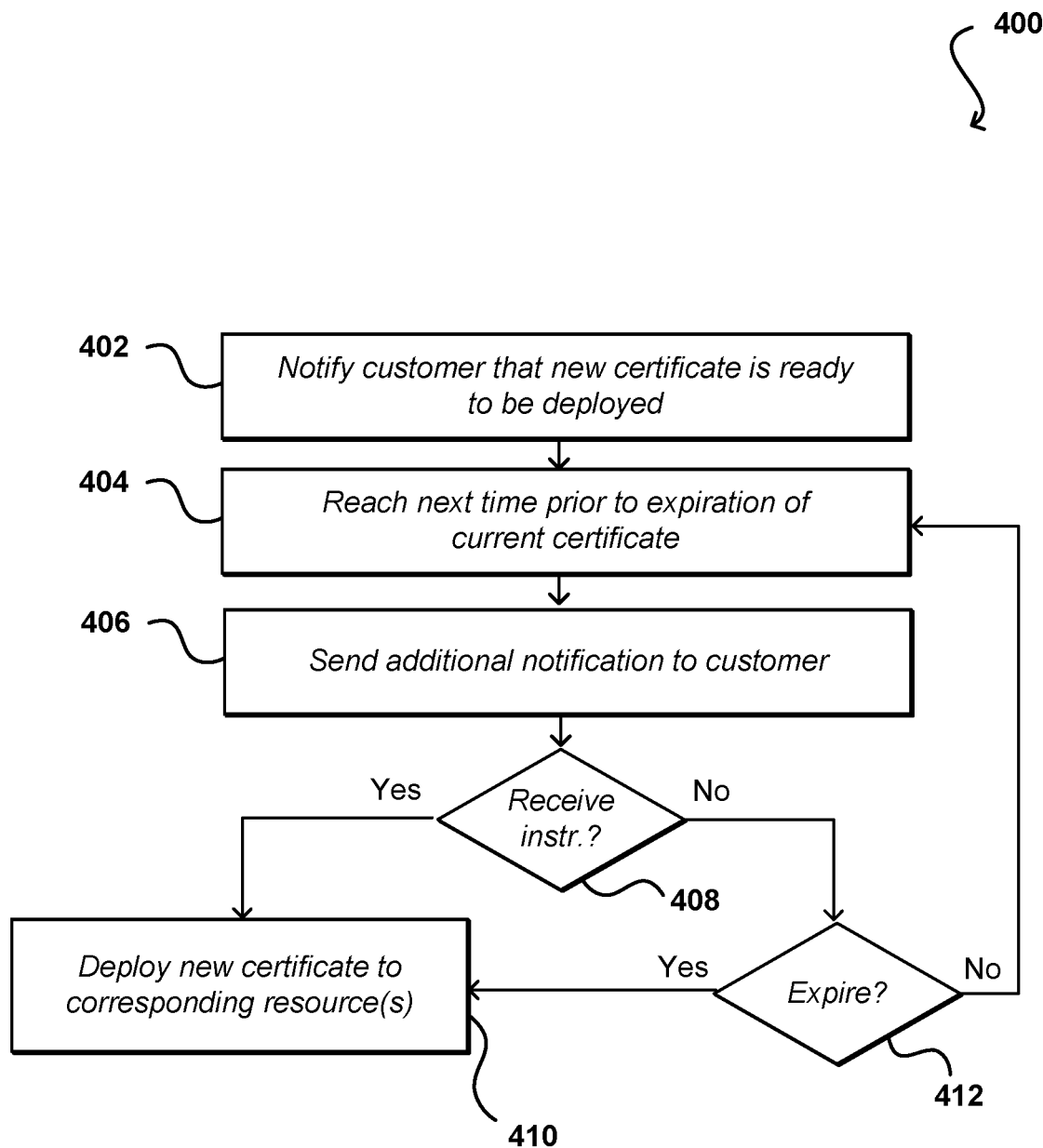
FIG. 4 illustrates an example process for notifying a customer that a certificate is about to expire and deploying a new certificate that can be utilized in accordance with various embodiments.

FIG. 4 illustrates an example process 400 for notifying the customer of a renewed and held certificate that can be utilized in accordance with various embodiments. In this example, the customer is notified 402 that a new certificate is ready to be deployed, as mentioned in the process of FIG. 3. After a notification is sent, the certificate manager can monitor or otherwise determine whether a response is received with respect to the certificate. If a next time threshold or value is reached 404 with respect to the expiration of the certificate, another notification can be sent 406 to the customer. This second notification can be sent according a time schedule determined by the customer, the provider, or another such entity as discussed elsewhere herein. In at least some embodiments, the schedule can include a time to automatically deploy a certificate for a particular resource if the customer has not previously provided instruction in response to a notification. If the first notification is sent two month before expiration, for example, the second notification might be sent one month before expiration. If an instruction is received 408, the certificate can be deployed 410 to the corresponding resource(s). If not, a determination can be made as to whether the certificate is about to expire 412, or whether there are additional notification periods remaining. If there are additional notification periods remaining, the process can continue and additional notifications can be sent according to the schedule or determined times, where the frequency of the notifications can increase as the time until the expiration of the certificate decreases. If no instruction is received and the certificate reaches its expiration time, or is about to reach its expiration time, the certificate manager in this example can automatically deploy 410 the new certificate to the appropriate resources. While in some embodiments the certificate may simply be allowed to expire, in this example the certificate manager can ensure that a new certificate is deployed if the current certificate expires, or is about to expire, in order to ensure that a valid certificate is always available for the customer on the associated resource(s).

Figure 5:
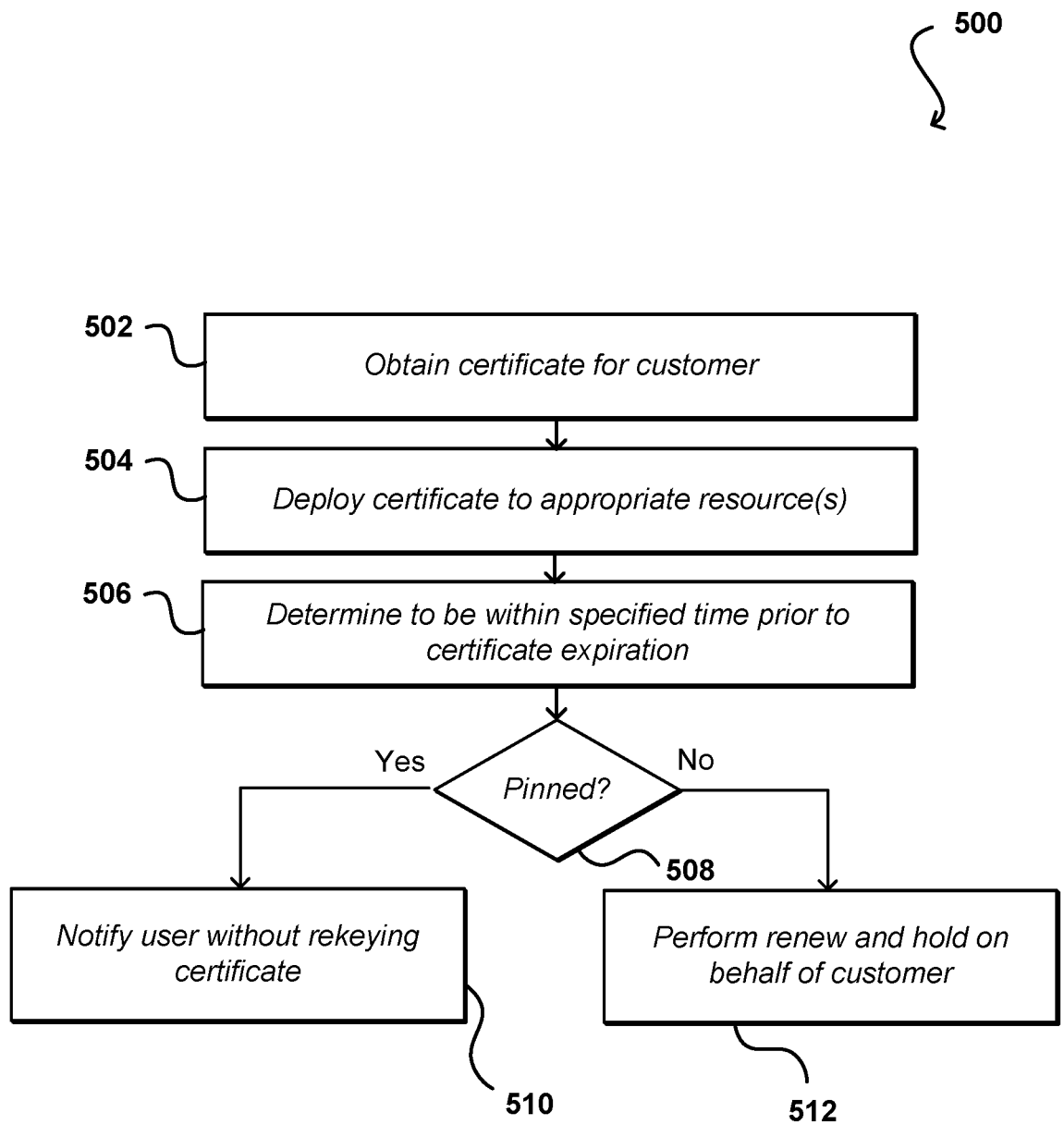
FIG. 5 illustrates an example process for preventing a renew and deploy process from being performed for a pinned certificate that can be utilized in accordance with various embodiments.

FIG. 5 illustrates an example process 500 for preventing a certificate from being re-keyed if that certificate is pinned by the user, which can be utilized in accordance with various embodiments. In this example, a certificate is obtained 502 using any of the approaches discussed or suggested herein. The certificate can be deployed 504 to the appropriate resources on behalf of the customer. A determination can be made 506 that a certificate is going to expire within a determined period of time. Another determination can be made 508 as to whether the particular certificate has been indicated by the customer to be pinned, such that the certificate should not be re-keyed. If not, a renew and hold can be performed 512 on behalf of the customer. If the certificate is pinned, the user can be notified 510 but no rekeying of the certificate will be performed without explicit instruction from the user.

Figure 6:
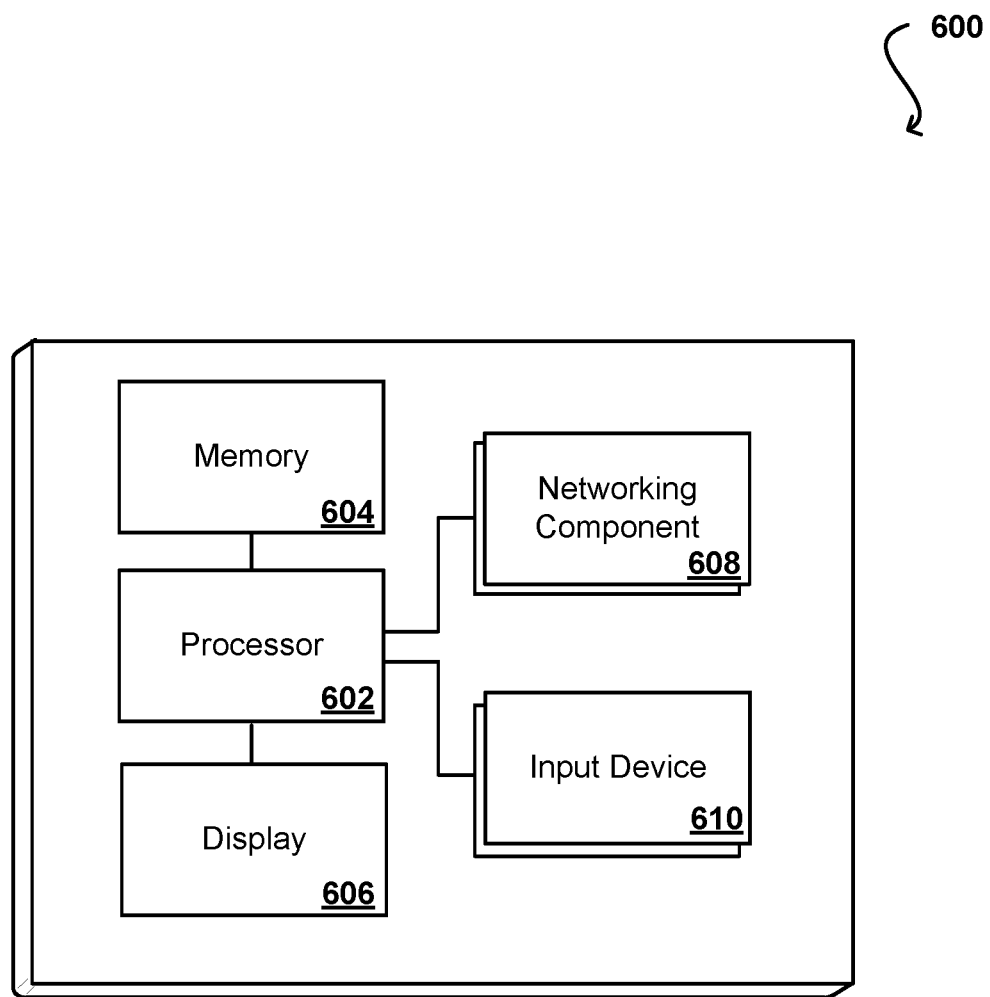
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, at a certificate management service of a resource-provider environment, a request to deploy a certificate to a resource of the resource-provider environment, the certificate to be deployed on behalf of a customer of the resource-provider environment, the customer associated with a policy that specifies actions authorized to be performed on behalf of the customer;
   causing the certificate to be deployed to the resource, information for the certificate being stored by the certificate management service;
   determining, using the information for the certificate, that the certificate is within a first determined period of time from an end of a validity period for the certificate;
   determining a configurable amount of time to store a new certificate, the configurable amount of time being determined from a set of time periods, wherein the set of time periods is provided by one or more deployment schedules or policies;
   obtaining, from a certificate authority, the new certificate on behalf of the customer, the new certificate being stored by the certificate management service for the configurable amount of time;
   providing, to the customer, a notification indicating availability of the new certificate to be deployed to the resource;
   determining, using the information for the certificate, that the certificate is within a second determined period of time from an end of the validity period and no instruction to deploy has been received on behalf of the customer; and
   causing the new certificate to be automatically deployed based at least in part on the policy, via the certificate management service, to the resource.

2. The computer-implemented method of claim 1, further comprising:
   providing additional notifications to the customer with increasing frequency between the first determined period of time and the second determined period of time if no instruction to deploy has been received on behalf of the customer.

3. The computer-implemented method of claim 1, further comprising:
   generating, by the certificate management service and on behalf of the customer, a public key and private key pair; and
   using the public key and private key pair to obtain, from a certificate authority, the certificate on behalf of the customer.

4. The computer-implemented method of claim 1, further comprising:
   determining, using the information for the new certificate, that the new certificate is within a first determined period of time from an end of a validity period for the new certificate;
   obtaining, from a certificate authority, a third certificate on behalf of the customer, the third certificate being stored by the certificate authority;
   providing, to the customer, a notification indicating availability of the third certificate to be deployed to the resource;
   receiving, on behalf of the customer, an instruction to deploy the third certificate; and
   causing the third certificate to be deployed to the resource.

5. A computer-implemented method, comprising:
   determining that a first certificate, deployed to a resource in a multi-tenant environment on behalf of a user, is within a first threshold amount of time from expiration, the user associated with a policy that specifies actions authorized to be performed on behalf of the user;
   determining a configurable amount of time to store a new certificate, the configurable amount of time being determined from a set of time periods, wherein the set of time periods is provided by one or more deployment schedules or policies;
   obtaining, from a certificate authority of the multi-tenant environment, the new certificate on behalf of the user;
   storing the new certificate in a certificate management service for the configurable amount of time;
   providing a notification to the user that the new certificate is available to be deployed to the resource; and
   causing, based at least in part on the policy, the new certificate to be deployed to the resource within a second threshold amount of time from expiration if an instruction to deploy has not otherwise been received on behalf of the user.

6. The computer-implemented method of claim 5, further comprising:
   determining, between the first threshold amount of time and the second threshold amount of time from expiration, that the instruction to deploy has not been received; and
   sending at least one additional notification to the user regarding the new certificate.

7. The computer-implemented method of claim 6, further comprising:
   sending the at least one additional notification with increasing frequency between the first threshold amount of time and the second threshold amount of time from expiration.

8. The computer-implemented method of claim 7, further comprising:
   receiving, from the user, a schedule for sending the at least one additional notification, the schedule further specifying of the first threshold amount of time and the second threshold amount of time.

9. The computer-implemented method of claim 7, further comprising:
   receiving, from the user, an instruction to deploy the new certificate to the resource, the instruction specifying a time at which to deploy the new certificate.

10. The computer-implemented method of claim 5, further comprising:
    receiving, from the user, an indication of at least one notification type to be used for notifying the user, the indication further capable of specifying different notification types for different notifications.

11. The computer-implemented method of claim 5, further comprising:
determining that the first certificate is deployed, on behalf of the user, to at least one additional resource;
notifying the user that the new certificate is available to be deployed to the at least one additional resource; and
enabling the user to provide separate instructions for deploying the new certificate to the resource and to the at least one additional resource.

12. The computer-implemented method of claim 5, further comprising:
determining that a second certificate deployed on behalf of the user is designated as a pinned certificate;
determining that the second certificate is within the first threshold amount of time from expiration; and
notifying the user that the second certificate is within the first threshold amount of time from expiration without rekeying the second certificate.

13. The computer-implemented method of claim 5, wherein the resource is one of a load balancer, a server, a computing device, a Web service, or a content delivery network.

14. The computer-implemented method of claim 5, wherein the first certificate is one of a transport layer security (TLS) certificate or a secure sockets layer (SSL) certificate.

15. The computer-implemented method of claim 5, further comprising:
generating, on behalf of the user, a public key and private key pair; and
using the public key and private key pair to obtain, from a certificate authority, the new certificate on behalf of the user.

16. A system, comprising:
at least one processor; and
memory including instructions that, when executed by the at least one processor, cause the system to:
determine that a first certificate, deployed to a resource in a multi-tenant environment on behalf of a user, is within a first threshold amount of time from expiration, the user associated with a policy that specifies actions authorized to be performed on behalf of the user;
determining a configurable amount of time to store a new certificate, the configurable amount of time being determined from a set of time periods, wherein the set of time periods is provided by one or more deployment schedules or policies;
obtain, from a certificate authority of the multi-tenant environment, the new certificate on behalf of the user;
store the new certificate in a certificate management service for the configurable amount of time;
provide a notification to the user that the new certificate is available to be deployed to the resource; and
cause, based at least in part on the policy, the new certificate to be deployed to the resource within a second threshold amount of time from expiration if an instruction to deploy has not otherwise been received on behalf of the user.

17. The system of claim 16, wherein the instructions when executed further cause the system to:
analyze one or more policies for the user to determine at least one of the first threshold amount of time or to automatically deploy the new certificate for the resource.

18. The system of claim 16, wherein the instructions when executed further cause the system to:
determine, between the first threshold amount of time and the second threshold amount of time from expiration, that the instruction to deploy has not been received; and
send at least one additional notification to the user regarding the new certificate, the at least one additional notification being sent with increasing frequency between the first threshold amount of time and the second threshold amount of time from expiration.

19. The system of claim 16, wherein the instructions when executed further cause the system to:
determine that the first certificate is deployed, on behalf of the user, to at least one additional resource;
notify the user that the new certificate is available to be deployed to the at least one additional resource; and
enable the user to provide separate instructions for deploying the new certificate to the resource and to the at least one additional resource.

20. The system of claim 16, wherein the instructions when executed further cause the system to:
determine that a second certificate deployed on behalf of the user is designated as a pinned certificate;
determine that the second certificate is within the first threshold amount of time from expiration; and
notify the user that the second certificate is within the first threshold amount of time from expiration without rekeying the second certificate.

* * * * *